United States Patent
Dyckman et al.

[11] 3,979,354
[45] Sept. 7, 1976

[54] NON-POLLUTING, ANTIFOULING COMPOSITION AND METHOD

[75] Inventors: Edward J. Dyckman, Laurel; Jean A. Montemarano, Annapolis; Eugene C. Fischer, Arnold; Robert R. Ressler, Annapolis, all of Md.

[73] Assignee: The United States of America as represented by the Secretary of the Navy, Washington, D.C.

[22] Filed: Jan. 31, 1974

[21] Appl. No.: 438,313

[52] U.S. Cl. ............ 260/37 EP; 106/15 R; 106/90; 260/2 M; 260/47 EC; 260/47 EP; 260/75 T; 260/429.7; 260/830 R; 424/288; 428/417; 428/541; 526/241; 526/304; 526/317; 526/320; 526/321
[51] Int. Cl.$^2$ ............ C08G 51/04; C08G 30/10
[58] Field of Search ............ 106/15 AF; 260/86.1 E, 260/47 EP, 47 EC, 2 EP, 2 EC, 2 M, 429.7, 348 R, 37 EP, 80.3 R; 424/288; 117/138.8 E

[56] References Cited
UNITED STATES PATENTS

| | | | |
|---|---|---|---|
| 3,147,285 | 9/1964 | Mack | 260/2 EP X |
| 3,154,460 | 10/1964 | Graner | 106/15 AF X |
| 3,622,524 | 11/1971 | Markovitz et al. | 260/2 EC |
| 3,684,752 | 8/1972 | Goto et al. | 106/15 AF X |
| 3,801,534 | 4/1974 | Beers | 260/37 EP |
| 3,854,960 | 12/1974 | Plum et al. | 106/15 AF |
| 3,861,949 | 1/1975 | Onozuka et al. | 260/429.7 X |

*Primary Examiner*—Murray Tillman
*Assistant Examiner*—T. Pertilla
*Attorney, Agent, or Firm*—R. S. Sciascia; A. L. Branning

[57] ABSTRACT

Objects which are designed to be submersed or submerged are rendered antifouling by using an organotin polymer wherein the tin is chemically combined in or bonded to the polymer. The polymer inhibits fouling of the exposed surface of the object while minimizing the effect on the surrounding environment due to reduced leaching of the organometallic compound from the polymer.

35 Claims, No Drawings

NON-POLLUTING, ANTIFOULING COMPOSITION AND METHOD

BACKGROUND OF THE INVENTION

This invention relates to a method and composition for preventing for an extended period of time fouling of submersed or submerged objects or marine structures while also minimizing pollution and more particularly to a method and composition for preventing fouling and pollution for an extended period of time by using organotin compounds chemically combined in or bonded to polymers.

From the beginning of man's attempt to use water to travel, he has been plagued with the problem of his ships, buoys, pilings, or other objects placed in the water, being fouled by organisms present in the water. It has been found that microorganisms, their viscous bio-organic products and absorbed organic matter, constitute a tenacious, opaque slime which forms on these submerged surfaces. The initial organisms in this fouling sequence are bacteria followed by a biotic progression of diatoms, hydrids, algae, bryozoans, protozoans, and finally macrofoulants. Macrofoulants tend to be rugophilic, settling on roughened surfaces in preference to smooth surfaces. It is thought that primary marine slimes precondition the surface in some manner stimulating the settling of macrofoulants. This theory is supported by the fact that barnacle settlement is less frequent on clean glass surfaces compared to those covered with emollient films high in particulate matter. This film may provide a physical substrate and/or a nutritive source which encourages the attachment of macroscopic plants and animals.

The resultant effect of a concentration of these plants and animals settling and attaching themselves to ships are well known: they contribute significantly to speed reduction; they increase fuel consumption; and, in the area of concern of water craft detection, they strengthen the noise signature of vessels under way thereby rendering covert activity more difficult.

This problem of marine growth (fouling) applies not only to vessels but also to other submersed or submerged objects. For example, fouling of sonar domes has been found to seriously limit the active and passive modes of operation of ships' acoustical systems. Fouling of moored data systems and ship-and-shore facilities by marine organisms impedes operations and necessitates a large maintenance allocation. Buoys shift due to the excessive weight of fouling organisms. Effective operation of sonars is hampered by the self-noise generated by the fouling of sonar dome surfaces. Wood pilings in berthing facilities undergo structural weakening and ultimate destruction due to marine borer and fungal attack. The fouling of piping including steel piping, and bronze couplings and fittings in the sea-water intake piping systems of ship-and-shore facilities, leads to reduced flow rates, valve seat damage, and accelerated metal corrosion. Concrete or ferro-cement or other similar structures are also adversely affected.

It is only since the beginning of this century that improvements have been made in the early Phoenicia methods of using copper cladding and poisonous paints to prevent fouling. Some of these improvements include the use of asphalt as an antifouling coating and coatings using copper or salts thereof. Organometallic salts (i.e. tri-n-butyltin oxide (TBTO), tri-n-butyltin fluoride (TBTF), tri-n-butyltin sulfide (TBTS), being extremely powerful biocides and toxic to a wide range of marine organisms are also components in a variety of antifouling coatings. Investigations into the use of organotin compounds for use in antifouling paints have received additional impetus because coatings with these compounds do not accelerate corrosion and exhibit excellent pigment retention.

These and other present state-of-the-art techniques possess several drawbacks which limit their use as effective methods of antifouling. Asphalt lacks the desired durability to make it an efficient answer to problems posed. Existing antifouling coating systems are paints which contain sufficient water soluble pigments, metal salts and inert fillers for direct contact to occur between the particles within the paint film; as one particle dissolves, another in contact with it is exposed to solvolysis. This process, called leaching is uncontrolled and varies with such factors as coating age, velocity, temperature, salinity, and the primary slime layer. Quantitative information indicates that in most cases the leaching rate is excessive and results in overkill. As such the best available antifouling coatings are inefficient and short lived because of the above mentioned leaching process. This inefficiency leads to the concentration of the toxic metallic components in quantities well above normal oceanic background. Furthermore, it is most important to note that after approximately 12 to 20 months, or 50,000 miles transit the presently used paint systems begin to foul which is indicative of the depletion of most antifouling metal (e.g., cuprous) oxide components from the coating into the marine environment. This short performance time is far less than the 5 year or more life desired for an antifouling coating. Also this depletion of toxic metal compounds into the wake of the ship is responsible for possible detection of ship movements and for pollution.

The leach rate of copper salts and organometallic salts from antifouling coating matrices is governed by the relative proportions and solubilities of three components: rosin, agent salt and pigment (e.g., copper oxides). Rosins are resinous organic acids which have a water solubility of 100 mg/cm$^2$/day. In addition to a relatively high solubility, rosins are consumed by sliming marine bacteria. This results in an accelerated biodegradable action, thus adding to the breakdown of the coating and subsequent accelerated release of metallic and organometallic salts. At present the main antifouling salts used by the United States Navy are $Cu_2O$ (cuprous oxide) (water solubility 0.5 mg/l) and TBTF (water solubility 2.9 mg/l). Leaching of inorganic and organometallic antifouling agent salts from coating formulations could be reduced by using their less water-soluble homologs in conjunction with insoluble pigments and as little rosin as possible.

SUMMARY OF THE INVENTION

Accordingly, it is an object of this invention to provide a method for rendering objects designed to be submerged or submersed antifouling.

It is also an object of this invention to provide a method for rendering objects designed to be submersed or submerged antifouling for an extended period of time.

It is a further object of this invention to provide a method for preventing the formation of a primary slime coating on submerged or submersed object.

Another object of this invention is to provide a method for preventing fouling of a submersed or submerged object while avoiding overkill and the resulting pollution.

It is also an object of this invention to provide a method for reducing the leaching rate of an antifouling moiety from an antifouling composition.

Yet another object of this invention is to provide a composition which is nonpolluting and prevents fouling and which is both effective and long-lasting.

It is also an object of this invention to provide a composition which is nonpolluting and prevents fouling.

It is a further object of this invention to provide a composition which is nonpolluting, prevents fouling and is durable.

It is a still further object of this invention to provide a composition which prevents the formation of a primary slime coating when the composition is used as a coating or shaped into an article.

It is another object of this invention to provide a composition which serves as a curing agent for and incorporates antifouling properties in a polymer.

It is yet another object of this invention to provide on antifouling composition wherein leaching rate of the antifouling moiety is reduced.

These and other objects of this invention are met by providing a method which comprises using an organotin containing polymer wherein the organotin is chemically combined with the polymer or an integral chemical part of the polymer, to form an object to be submersed or submerged and by providing a composition which is antifouling and nonpolluting; and a composition for incorporating antifouling and nonpolluting properties into a polymer.

DESCRIPTION OF THE PREFERRED EMBODIMENTS

The present invention provides a novel polymeric material possessing low leaching, nonpolluting, biocidal properties, which upon application to a surface or incorporation in an article results in an object which is antifouling and lessens possible pollution due to the fact that the biocidal quality of the polymeric material protects the surface or article without being detrimental to the animal or vegetable life immediately surrounding the protected article or surface thereby preventing pollution.

This new generation of biocidal polymers consists of (1) low leaching, antisliming, organometallic polymers suitable as protective coatings for ship bottoms and other submerged surfaces, wherein the backbone polymer is a vinyl resin such as a polyacrylate or a poly (methyl vinyl ether/maleic acid); an alkyd resin; or an epoxy resin; and chemically incorporated in the polymer is a $R_3Sn$ group such as tributyltin, tripropyltin, triphenyltin; or tribenzyl tin. These polymers are also used in any number of suitable forms including (1) low leaching organometallic polymeric films suitable for use as coatings or in reinforced on self-supporting structures; (2) low leaching organometallic polymeric syrups of the above described organometallic polymers applicable for the impregnation of structural woods in order to preserve these structures against bacteria, fungi and marine foulant attack; and (3) low leaching, granulated, organometallic polymers to be used for incorporation into ferro-cement, and other marine and fresh water concrete structures, thus producing a homogeneous nonfouling ferrocement and/or concrete structural composite.

It is estimated that these materials will extend the longevity of antifouling systems to at least 5 years. In addition, transparent, nonwettable, slimicidal films of the organometallic polymers can be used on underwater optical devices.

Because state-of-the-art antifouling technology does not provide a means of controlling the leaching rate of toxic coating components into the marine environment, the idea of chemically binding biocidal organometallic compounds on polymer backbones is suggested as a solution to the problem. The resultant materials, organometallic polymers, are surface hydrolyzed in sea water to trigger their antifouling effectiveness. Laboratory studies show that the chemically bound organometallic moieties are released at a rate that is dependent on the nature of the organometallic polymer. As part of an effort to develop antifouling coatings having the lowest possible controlled leaching rates, various organometallic polymers are sythesized for the purpose of determining the rate of release of organometallic moieties from these polymers as well as their antifouling effectiveness. Factors influencing the rate of hydrolysis of the organometallic polymer, include polymer type, the degree of cross-linking within the polymer backbone and the degree of substitution by organometallic groups along the polymer backbone. Environmental conditions such as sea-water temperature, salinity, oxygen content, hydrogen ion concentration, and turbulence also are expected to influence the rate. Due to water hydrolysis, these organometallic ions are released from the polymer backbone at a controlled rate at least one order of magnitude less than state-of-the-art antifouling coatings. As a result, this chemical conservation of the biocidal organometallic agents will provide longer-term antifouling protection for submerged surfaces, while reducing the pollution hazard attributed to presently used antifouling coatings by a factor of ten, at least.

Any suitable means is used to incorporate the organotin moiety into the polymer. Basically one way of incorporation is accomplished by using an esterification reaction between the organotin compound and a free carboxylic acid group. Organotin oxides or hydroxides are the most suitable materials for incorporating the organotin into the polymer. The organo-groups on the tin are at least one selected from the group consisting of propyl, butyl, benzyl, and phenyl. Other groups do not appear to give the required long life antifouling capabilities. While it is not desired to be limited to any particular theory, it is believed that the chemical combination with the polymer prevents excess leaching of the organotin which serves as a biocide. Because excess leaching does not take place, there is no excess biocide in the water. Hence, there is no killing of plant and animal life in the water surrounding the surface or article protected by the organotin polymer. The lack of excess leaching also gives the coating longer life as an antifouling coating which protects the surface in addition to the nonpolluting features.

The reaction with the carboxylic acid group is carried out in a number of ways. A monomeric acid is esterified with a suitable tin compound and polymerized alone or in combination, with other monomers which may or may not contain organotin materials. The tin compound is reacted with free carboxylic groups on a polymer. Also, the organotin compound can be chemically combined with a crosslinking or curing agent and used to crosslink or cure a polymer, especially a thermosettable polymer. Any other suitable means can also be used to chemically incorporate the organotin compound into a polymer provided the tin compound is chemically bonded to the polymer. It is the chemical bond which gives durability, antipolluting, antifouling and other desirable features to the polymer.

Of the particular organotin groups, the tributyl or tripropyl group is the most effective because of greater toxicity. The tributyl tin compounds e.g., oxide, hydroxides can also be chemically reacted with a polymer chemically bonded to other tin compounds. The tributyl or tripropyl tin compound in combination with another organotin compound on a polymer also produces an antifouling composition more durable than the second organotin compound alone. Also various tin-containing polymers can be mixed in any proportion in order to achieve desired antifouling properties. Further a single polymer may contain more than one type of organotin compound. Mixtures of organotin compounds on a polymer or mixtures of organotin containing polymers are effective against a broader spectrum of fouling agents.

The tin compound has a basic structure of

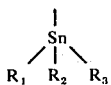

$R_1$, $R_2$, and $R_3$ are selected from a group consisting of butyl, propyl, phenyl and benzyl. $R_1$, $R_2$ and $R_3$ can also be the same or different.

Suitable polymers with which the organic tin moieties may be chemically combined are thermoplastic polymers such as vinyl polymers and thermosetting polymers such as polyester resins and epoxy polymers. Acrylic polymers include homopolymers and copolymers of acrylic and methacrylic monomers as vinyl polymers. Organotin esters are present in the acrylic polymers. The organotin containing polymers can be formed by copolymerizing organotin compound acrylic esters alone or in combination with monomers which may or may not contain an organotin moiety. Suitable monomers to form the acrylic polymers are acrylic acid and methacrylic acid. To incorporate the organotin compound in the acrylic polymer, the acid groups are usually esterified with the organotin compounds in order to incorporate the desired tin compound therein.

Another suitable vinyl polymer is a copolymer of methyl vinyl ether and maleic acid. Incorporation of the organotin compound is achieved by esterification of the acid group.

The development of organometallic polyesters and organometallic epoxies as antifouling materials has also been accomplished. Unsaturated alkyd resins prepared from the condensation reaction of polyhydric alcohols such as glycols and other polyols and polybasic acids such as adipic, sebacic, phthalic and maleic are cured with tributyltin methacrylate in a 1:1 molar ratio using an initiator to produce organometallic polyesters. Styrene in varying proportions may be added also to the monomer mixture prior to curing. These organometallic polyesters can either be dissolved in a solvent with or without additives such as pigment, thixotropic agents, antisettling agents, to produce an antifouling coating, or used by themselves in antifouling applications, i.e., antifouling gel coats. Furthermore, incorporation of glass fibers into this resin could produce a glass reinforced laminate with antifouling capability. In addition to incorporating the organotin moiety by curing an unsaturated resin with tributyltin methacrylate or other organometallic unsaturated monomers, the organotin group can be chemically incorporated on the resin backbone by esterification of some of the free carboxyl groups present where polybasic acids have been used in the resin formulation.

The concept of producing an antifouling structural plastic by curing with an organometallic agent can also be applied to epoxy resins. Unsaturated acids such as acrylic acids are known curing agents for glycidyl ether epoxy resins. When an organic acid is employed to cure an epoxy resin in an hydroxyl-free medium, the initial reaction involves the carboxyl group, followed by the reaction of the epoxy with the formed hydroxyl. The double bond of an unsaturated acid during this reaction remains inactive, and may be used to incorporate the organometallic reagent on the curing agent. It is known that tributyltin methacrylate can be copolymerized with methacrylic acid. Therfore, a low molecular weight copolymer of tributyltin methacrylate and methacrylic acid can be utilized as an organometallic curing agent for epoxy resins. Modifications of the structures of the amines, polyamines, polycarboxylic acids, and like compounds presently used as epoxide curing agents by incorporation of a tributyltin carboxylate group, e.g. $H_2NCH_2CO_2SnR_3$ and $R_3SnO_2C-CH=CH-CO_2H$ where R is an organic radical can be prepared to function as new curing agents serving as carriers for the biocidal organotin group. In addition, novel organometallic epoxy resins can also be prepared. The esterification of acid groups on the resin backbone produces organometallic epoxy resins of the following generalized formula:

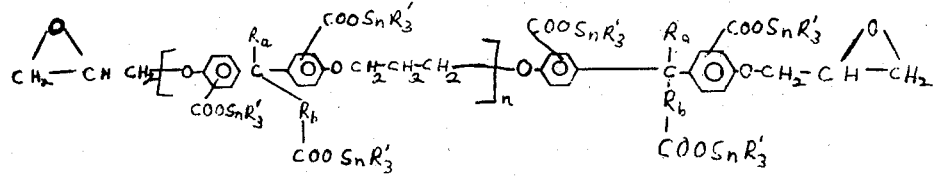

where $R_a$ and $R_b$ are any alkyl group of up to 25 carbon atoms and need not be the same; R' is a butyl, propyl benzyl, phenyl; $n$ represents the number of repeating units and ranges from 1 to about 35,000.

The above diagram indicates that the tributyltin carboxylate group may be attached to the aromatic rings and/or the aliphatic side chains. Organotin epoxy resins may also be prepared by the copolymerization of an organotin methacrylate such as tributyltin methacrylate with glycidyl methacrylate to produce the following structure:

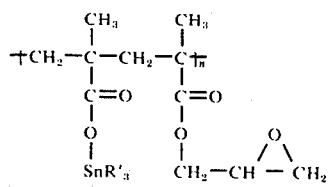

where R' is a butyl, propyl or benzyl, group $n$ represents the number of repeating units and ranges from about 1 to about 35,000.

Organotin methacrylate can also be copolymerized with unsaturated epoxy resins such as unsaturated analogs of bisphenol A,

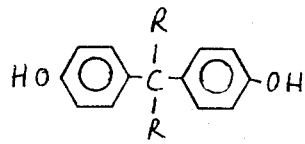

where either or both R groups are unsaturated alkyl chains. These organometallic epoxy resins can be cured with either organometallic curing agents such as described above or commercially available curing agents which do not contain the organometallic agent. Organometallic epoxy resins when prepared by any of the above syntheses are antifouling materials useful either as coatings or in structural applications.

The effectiveness of the organotin containing polymer as to both antifouling capabilities and durability depends on the amount of organotin present. Molecular weight of the polymer does not appear to have an effect on these properties. However, polymers having a 6000–7000 molecular range are more conveniently used. The amount of organotin is affected by the tin content of the polymer and the amount of the polymer being used. The organotin containing component is operable in any range. But the polymer which contains at least 20% of the organotin component is most effective. For example, if organotin methacrylate and methyl methacrylate are polymerized together, there should be at least one unit of organotin methacrylate for every four units of methyl methacrylate. With regard to the amount of polymer present, the polymer as a coating has been tested, and the following conclusions drawn. While any reasonable coating thickness is feasible, coatings up to ⅛-inch thick are most useful. Coatings in the neighborhood of 20 mils thickness are useful. Thickness varies with amount of tin in the polymer and the length of time for which protection is desired.

The following examples are present to illustrate the invention without unduly limiting the invention. All parts and percentages are by weight of the composition unless otherwise specified.

EXAMPLE I

This example illustrates the making of a variety of polymers suitable for antifouling and antipolluting uses.

SYNTHESES OF ORGANOMETALLIC POLYMERS

Since the preparation of several of the organometallic polyacrylates is similar, the preparation of P1, poly-tri-n-butyltin-acrylate, is given in detail as an example. Analysis is done on atomic absorption spectroscopy.

P1, POLY-TRI-N-BUTYLTIN-ACRYLATE

The reaction is carried out in a 1-liter, 3-necked flask, provided with an azeotropic distillation head connected to a reflux condenser, a thermometer positioned such that it reads the temperature of the reaction solution, and a stopper. The reaction solution is stirred by means of a magnetic stirrer. In the reaction flask, polyacrylic acid (24 grams, 0.333 mole) is added to a solution of tri-n-butyltin oxide (84.8 ml, 0.167 mole) and dichloromethane (250 ml). The reaction is refluxed for 2 hours, at the end of which 3 ml of water is formed and collected by azeotropic distillation. The resultant clear organometallic polymer is cast in a film from the dichloromethane solution. Analysis calculated on atomic absorption spectroscopy for P1: Sn, 33% Found: Sn, 32,68%.

P2, POLY-TRI-N-PROPYLYTIN-ACRYLATE

P2 is prepared similar to P1 except that tri-n-propyltin oxide (68.2 ml, 0.167 mole) is the organometallic and benzene was the solvent. Three ml of water are formed by this reaction. The product polymer is again clear and is cast as a film from the benzene solution. Analysis calculated for P2: Sn, 37%. Found: Sn, 36.52%.

P4, POLY (TRI-N-BUTYLTIN-ACRYLATE/TRI-N-PROPYL-TIN-ACRYLATE)

P4 is synthesized by the general method described above. In this synthesis, equimolar quantities of tri-n-butyltin oxide (42.2 ml, 0.083 mole) and tri-n-proplytin oxide (33.9 ml, 0.083 mole) are reacted with polyacrylic acid in benzene to give a polymer with alternating organometallic groups. After 3 hours of refluxing, 3 ml of water are collected azeotropically. This clear polymer is cast as a film from the benzene solution.

P13, POLY-TRI-N-BUTYLTIN-METHACRYLATE

P13 is perpared in the usual manner from the reaction of crosslinked polymethacrylic acid (28.8 grams, 0.167 mole) and tri-n-butyltin oxide (42.2 ml, 0.083 mole) in toluene (300 ml). After the reaction had run for 3 hours, 16.2 ml of water are formed. The reaction mixture is filtered, and the isolated white powdery product is then washed with toluene. Analysis calculated for P13: Sn, 32%. Found: Sn, 27.77%.

P16, POLY-TRIMETHYLTIN-ACRYLATE

P16 is prepared as poly-tri-n-butyltin-acrylate except that the organometallic is trimethyltin hydroxide (60 grams, 0.333 mole) and the solvent is benzene (300 ml). The reaction is terminated at the end of 2 ½ hours. Five ml of water are produced by this synthesis. The white powdery product is isolated by filtering and washing the reaction mixture with benzene. Analysis calculated for P16: Sn, 51%. Found: Sn, 28.24%.

P17, POLY-TRIMETHYLTIN-METHACRYLATE

P17 is synthesized as described above by the reaction of crosslinked polymethacrylic acid (28.8 grams, 0.167 mole) and trimethyltin hydroxide (30 grams, 0.167 mole) in toluene (300 ml). After 19 hours the reaction is terminated and 16.1 ml of water are collected. The reaction mixture is filtered and washed with toluene. The resulting polymer product consists of a cream-colored, granular material. Analysis calculated for P17: Sn, 48%. Found: Sn, 8.74%.

P24, POLY-TRIBENZYLTIN-ACRYLATE

P24 is synthesized similar to P1 except that tribenzyltin hydroxide (68.19 grams, 0.167 mole) is the organometallic and benzene (300 ml) is the solvent. After running the reaction for 2 hours, 2.5 ml of water are formed. After the solvent evaporates, a clear product polymer remains which is in the form of a film. Analysis calculated for P24: Sn, 26%. Found: Sn, 23.31%.

P28, POLY-TRIPHENYLTIN-ACRYLATE

P28 is made as P1 where triphenyltin hydroxide (100.2 grams, 0.273 mole) is reacted with an equimolar quantity of polyacrylic acid (19.65 grams, 0.273 mole) in benzene (400 ml). The reaction runs for 2 hours, at the end of which 4.9 ml of water had been collected azeotropically. P28 is isolated as a cream-colored powder. Analysis calculated for P28: Sn, 29%. Found: Sn, 31.34%.

P29, POLY-TRI-N-BUTYLTIN-METHACRYLATE

P29 is the reaction product of polymethacrylic acid (28.7 grams, 0.334 mole) and tri-n-butyltin oxide (84.4 ml, 0.167 mole). The reaction is run in benzene (300 ml) for 3 hours, and 4 ml of water are collected azeotropically. P29 is a clear polymer and forms a film when the solvent is evaporated. Analysis calculated for P29: Sn, 33%. Found: Sn, 28.22%.

P31, POLY-TRI-N-PROPYLTIN-METHACRYLATE

P31 is prepared from the reaction of crosslinked polymethacrylic acid (28.8 grams, 0.167 mole) and tri-n-propyltin oxide (33.9 ml, 0.084 mole) in toluene (200 ml), After 3 hours of refluxing, 16.0 ml of water were formed. This high density polymer is a white powder. Analysis calculated for P31: Sn, 36%. Found: Sn, 31.71%.

P34, POLY-TRI-N-PROPYLTIN-METHACRYLATE

P34 is the product polymer produced by the reaction of polymethacrylic acid (28.7 grams, 0.334 mole) and tri-n-propyltin oxide (67.8 ml, 0.167 mole) in benzene (300 ml). After 4 ½ hours, 5 ml of water are formed and removed by azeotropic distillation. P34 is a clear product and is cast as a film from a benzene solution. Analysis calculated for P34: Sn, 36%. Found: Sn, 34.19%.

P36, TRI-N-BUTYLTIN ESTER OF POLY(METHYL VINYL ETHER/MALEIC ACID)

The preparation of P36 is carried out in a 1-liter, 3-necked flask provided with a mechanical stirrer, an azeotropic distillation head connected to a reflux condenser, and a thermometer positioned such that it reads the temperature of the reaction solution. The poly(methyl vinyl ether/maleic acid) (29.0 grams, 0.167 mole) is added to the reaction flask, which already contained benzene (300 ml) and tri-n-butyltin oxide (84.4 ml, 0.167 mole). At the end of 3 hours, 6 ml of water is collected azeotropically. P36 is a yellow transparent product which can be cast as a film from the benzene solution. Analysis calculated for P36: Sn, 32%. Found: Sn, 30.80%.

P37, TRI-N-BUTYLTIN ESTER OF POLY)METHYL VINYL ETHER/MALEIC ACID)

P37 is prepared as P36 is, except a higher molecular weight poly(methyl vinyl ether/maleic acid) is used. During this reaction, 6.1 ml of water are collected azeotropically. The resultant product is clear and can be cast as a film from the benzene solution. Analysis calculated for P37: Sn, 32%. Found: Sn, 30.55%.

P38, TRI-N-PROPYLTIN ESTER OF POLY(METHYL VINYL ETHER/MALEIC ACID)

P38 is synthesized similar to P36. The low molecular weight poly(methyl vinyl ether/maleic acid) (29.0 grams, 0.167 mole) is reacted with tri-n-propyltin oxide (67.8 ml, 0.167 mole). From this azeotropic distillation, 6.9 ml of water are collected. P38 is a yellow, transparent polymer which can be cast as a film from the benzene solution. Analysis calculated for P38: Sn, 36%. Found: Sn, 34.86%.

P39, TRI-N-PROPYLTIN ESTER OF POLY(METHYL VINYL ETHER/MALEIC ACID)

P39's synthesis follows that of P36, although the higher molecular weight poly(methyl vinyl ether/maleic acid) (29.0 grams, 0.167 mole) and the tri-n-propyltin oxide (67.8 ml, 0.167 mole) are used. From this reaction, 6.1 ml of water are collected azeotropically. P39 is isolated as a clear product which can be cast as a film from benzene solution. Analysis calculated for P39: Sn, 36%. Found: Sn, 32.68%.

Several of the organometallic polymers are polymerized from their prepared monomers, instead of attaching an organometallic moiety to the polymer backbone. The preparation of Ppoly(tri-n-butyltin methacrylate/methyl methacrylate) characterizes the polymerization of organometallic monomers.

P30, POLY(TRI-N-BUTYLTIN METHACRYLATE/METHYL METHACRYLATE)

The monomers of P30 are first synthesized. Tri-n-butyltin methacrylate prepared according to Montermoso et al U.S. Patent 3,016,369. Uninhibited methacrylic acid (37.8 ml, 0.444 mole) and tri-n-butyltin oxide (112.5 ml, 0.222 mole) were reacted in 200 ml of dichloromethane. Upon refluxing for 1 hour, 4.5 ml of water are collected azeotropically. After the reaction is completed, the solvent is evaporated under vacuum. The product ester is a yellow transparent liquid. The monomers are then copolymerized in a 1-liter, 3-necked flask equipped with a reflux condenser, a thermometer, such that it reads the temperature of the reactants, and a mechanical stirrer. Tri-n-butyltin methacrylate (50 grams, 0.140 mole), uninhibited methyl methacrylate (50 grams, 0.580 mole), and benzoyl peroxide (0.5% by weight) are reacted in 200 ml of benzene. The solution polymerization is allowed to reflux for 8 hours. The resultant polymer is clear and can be cast as a film from the benzene solution. Analysis calculated for P30: Sn, 25%. Found: Sn, 16.28%.

P41, POLY-TRI-N-BUTYLTIN-METHACRYLATE

The preparation of P41 is done in order to produce a homopolymer from its monomer. Tri-n-butyltin methacrylate is prepared as described above for P30. The purified monomer was then polymerized in benzene (200 ml) with methyl ethyl ketone peroxide (1% by weight) as the initiator. The polymerization takes 3 hours. The resultant product is a colorless, transparent organometallic polymer which could be cast as a film from its benzene solution. Analysis calculated for P41: Sn, 32%. Found: Sn, 29.05%.

P42, POLY(TRI-N-BUTYLTIN METHACRYLATE/METHYL METHACRYLATE)

P42 is prepared exactly as P30; however in this polymerization the molar ratio of the two monomers is varied. The tri-n-butyltin methacrylate (174.4 grams, 0.444 mole) was used in a 2:1 molar ratio with the uninhibited methyl methacrylate (20.0 grams, 0.222 mole). Benzoyl peroxide (1% by weight) is used as the initiator for the copolymerization. The product polymer is again a colorless, transparent material which can be cast as a film from the benzene solution. Analysis calculated for P42: Sn, 30%. Found: Sn, 25.39%.

P43, POLY(TRI-N-BUTYLTIN METHACRYLATE/METHYL METHACRYLATE)

The polymerization of P43 is similar to that of P30. The same monomers, tri-n-butyltin methacrylate (174.4 grams, 0.444 mole) and uninhibited methyl methacrylate (40.0 grams, 0.444 mole) are copolymerized in equimolar quantities. The initiator for this solution polymerization is benzoyl peroxide (1% weight). P43 is a colorless, transparent copolymer that can be cast as a film from the benzene solution. Analysis calculated for P43: Sn, 25%. Found: Sn, 21.03%.

P45, POLY(TRI-N-BUTYLTIN-METHACRYLATE/-METHYL METHACRYLATE)

The synthesis of copolymer P45 is performed according to the method for P30. However, the molar ratio of the two monomers is varied such that 2 moles of tri-n-butyltin methacrylate (174.4 grams, 0.444 mole) are used for every 3 moles of uninhibited methyl methacrylate (60.0 grams, 0.666 mole). Benzoyl peroxide (1% weight) is the initiator for the polymerization. The organometallic copolymer is colorless and transparent and can be cast as a film from the benzene solution.

Since the preparation of the organometallic polystyrenes is similar, the preparation of S4, poly (tri-n-butyltin methacrylate/styrene), is given in detail as an example.

S4, POLY(TRI-N-BUTYLTIN METHACRYLATE/STYRENE)

Tri-n-butyltin methacrylate is synthesized according to Montermoso, et al, U.S. Pat. No. 3,016,369 (1962). The product, a yellow, transparent liquid, is dissolved in petroleum ether and recrystalized upon cooling below 20° C. Crystals of tri-n-butyltin methacrylate has a melting point of 18°C. Styrene uninhibited by vacuum distillation and the two monomers are then copolymerized in a 1-liter, 3-necked resin flask equipped with a reflux condenser, a thermometer, such that it reads the temperature of the reactants, and a mechanical stirrer. Tri-n-butyltin methacrylate (0.053 mole), uninhibited styrene (0.192 mole), and 2,2'-azobis (2 methylpropionitrile) (0.1% by weight) are reacted in 50 ml of benzene. An additive, salicylaldehyde (0.2% by weight) is added prior to polymerization to act as an ultraviolet light absorber. The solution polymerization is allowed to reflux for 48 hours. The resultant polymer was a transparent, yellow tinted resin which could be cast as a film from the benzene solution. Tin analysis of S4: 16.64% Sn.

S5, POLY(TRI-N-BUTYLTIN METHACRYLATE/STYRENE)

S5 is synthesized by the general method described above. In this synthesis, equimolar quantities of tri-n-butyltin methacrylate (0.1 mole) and styrene (0.1 mole) are reacted with the azo initiator* in 85 ml of toluene for 96 hours. The resultant polymer is a transparent, orange tinted elastomer which could be cast as a film from the toluene solution. Analysis shows 20.90% Sn.

*Azo initiator stands for 2,2'-azobis(2-methyl propionitrile).

S6, POLY(TRI-N-BUTYLTIN METHACRYLATE/STYRENE)

S6 was prepared as above (1:1 molar ratio) in 300 ml of toluene for 144 hours. The antioxidant, 2,4-dinitrophenylhydrazine (2.0 by weight) is added before polymerization. The resultant polymer is a transparent, yellow tinted elastomer that can be cast as a film from the toluene solution. Analysis shows 23.73% Sn.

S7, POLY(TRI-N-BUTYLTIN METHACRYLATE/STYRENE)

S7 is prepared as above (1:1 molar ratio) in 200 ml of toluene for 264 hours. Both an antioxidant, 4-cyclohexyleyclohexanol (2.0% by weight) and ultraviolet light absorber, Uvinol M-40 (1.0% by weight) are additives in this synthesis. The resultant polymer is a transparent, orange tinted elastomer that can be cast as a film from the toluene solution. Analysis shows 25.43% Sn.

S8, POLY(TRI-N-BUTYLTIN METHACRYLATE/STYRENE)

S8 is prepared with the same additives as in S7. In this synthesis unequal molar quantities of tri-n-butyltin methacrylate (0.1 mole) and styrene (0.2 mole) are reacted with the azo initiator in 200 ml of toluene for 24 hours. The resultant polymer is a transparent, yellow tinted elastomer that can be cast as a film from the toluene solution. Analysis shows 20.46% Sn.

S10, POLY(TRI-N-BUTYLTIN METHACRYLATE)

Tri-n-butyltin methacrylate (0.1 mole) is polymerized using benzoyl peroxide (0.1% by weight) as the initiator in 200 ml of benzene for 24 hours. An antioxidant, Irganox 1076 (0.15% by weight) and an ultraviolet light absorber, Tinuvin P (0.25% by weight) were additives in this synthesis. The resultant polymer was a transparent, colorless elastomer that could be cast from the benzene solution. Analysis shows 31.53% Sn.

S11, POLY(TRI-N-BUTYLTIN METHACRYLATE/STYRENE)

S11 is synthesized as S10 in a 1:1 molar ratio of tri-n-butyltin methacrylate (0.1 mole) and styrene (0.1 mole). The resultant polymer was colorless and clear and could be cast as film from the benzene solution. Analysis shows 30.01% Sn.

P51, POLY(TRI-N-BUTYLTIN METHACRYLATE/TRI-N-PROPYLTIN METHACRYLATE/METHYL METHACRYLATE)

The monomers of P51 are first synthesized. Tri-n-butyltin methacrylate is prepared as is tripropyltin methacrylate. These esters are isolated as crystals from petroleum ether. Methyl methacrylate is uninhibited. All uninhibited monomers are refrigerated below 40°F when stored for short periods of time. Tri-n-butyltin methacrylate (0.4 mole), tri-n-propyltin methacrylate (0.4 mole) and methyl methacrylate (0.4 mole) are reacted in 300 ml of benzene using benzoyl peroxide (0.5% by weight) as initiator. The reaction mixture is refluxed for 24 hours in a 1-liter, 3-necked resin flask equipped with a reflux condenser, a thermometer, such that it reads the temperature of the reactants and a mechanical stirrer. The resultant polymer is clear and can be cast as a film from the benzene solution. Analysis shows 29.35% Sn.

P62, POLY(TRI-N-BUTYLTIN METHACRYLATE/TRI-N-PROPYLTIN METHACRYLATE/METHYL METHACRYLATE)

The preparation of P62 is identical to that of P51.

The preparation of cross-linked unsaturated polyesters is also performed. The syntheses of these polyesters are similar thus, the preparation of P52 is given as an example.

P52, POLYCONDENSATION PRODUCT OF MALEIC ANHYDRIDE, PROPYLENE GLYCOL AND EHTYLENE GLYCOL CROSS-LINKED BY TRI-N-BUTYLTIN METHACRYLATE

A mixture of propylene glycol (2.0 mole), ethylene glycol (0.70 mole), and 100 ml of toluene is placed in a 1-liter, 4-necked resin flask which was equipped with a Dean and Stark trap which is connected to a reflux condenser; a thermometer, which reads the temperature of the reactants, a mechanical stirrer, and a nitrogen gas inlet. The mixture is heated with stirring under a gentle stream of nitrogen at 150°–180°C for 15 minutes while water is collected in the Dean and Stark trap. The Dean and Stark trap is drained and distillation is continued until all the 100 ml of toluene were recovered. The apparatus is allowed to cool, and maleic anhydride (1.25 mole) is added to the dried glycols. The Dean and Stark trap is filled with xylene and 100 ml of xylene is added to the flask. The temperature is quickly raised to 200°C, while a nitrogen stream is maintained. Water is collected in the Dean and Stark trap and lost xylene is replaced during heating for 2 hours. At the end of that time, all xylene is collected. The flask is removed from the heating mantle and the unsaturated resin is cooled to 50°C. During this cooling time, a solution of tri-n-butyltin methacrylate (0.144 mole) with benzoyl peroxide (0.5% by weight of total reactants) is prepared. The warm unsaturated polyester resin (0.072 mole) is transferred (under nitrogen) into a 100 ml, 4-necked resin flask equipped with a reflux condenser, a thermometer such that it reads the temperature of the reactants, a nitrogen inlet, and a mechanical stirrer. The tri-n-butyltin methacrylate/benzoyl peroxide solution is mixed in with the unsaturated polyester and heated at 80°C for 2 hours. The resultant cross-linked polyester resin is dissolved in refluxing benzene and can be cast as a transparent, yellow elastomeric film from benzene solution. Acid number, of the unsaturated polyester resin prior to curing with tri-n-butyltin methacrylate was 30. Analysis shows 24.11% Sn.

P53 POLYCONDENSATION PRODUCT OF MALEIC ANHYDRIDE, PROPYLENE GLYCOL AND ETHYLENE GLYCOL CROSS-LINKED BY TRI-N-BUTYLTIN METHACRYLATE

P53 is prepared similar to P52 except that the amounts of reactants used are maleic anhydride (0.625 mole), propylene glycol (0.5 mole), and ethylene glycol (0.175 mole). Tri-n-butyltin methacrylate (0.222 mole), the unsaturated alkyd resin (0.222 mole), and benzoyl peroxide (0.5% by weight) are reacted at 95°C for 45 minutes. The resultant polymer is dispersed in benzene and can be cast as a white granulated film. The acid number is 73 and analysis shows 20.20% Sn.

P54 POLYCONDENSATION PRODUCT OF SEBACIC ACID AND BUTENEDIOL CROSS-LINKED BY TRI-N-BUTYLTIN METHACRYLATE

P54 is synthesized by the general method above. In this synthesis, equimolar quantities of sebacic acid (0.2 mole) and 2-butene-1,4-diol (0.2 mole) underwent polycondensation. The resultant unsaturated alkyd is then cured with tri-n-butyltin methacrylate (0.2 mole) using benzoyl peroxide (0.5% by weight) as the initiator. The resultant polymer can be cast as a yellow, opaque film from benzene solution. The acid number is 81 and analysis finds 21.11% Sn.

P56 POLYCONDENSATION PRODUCT OF MALEIC ANHYDRIDE AND D-SORBITOL CROSS-LINKED BY TRI-N-BUTYLTIN METHACRYLATE

P56 is prepared as above by reacting maleic anhydride (0.16 mole) and D-Sorbitol (0.16 mole). This unsaturated alkyd is dissolved in dimethyl sulfoxide (DMSO) and is cured with tri-n-butyltin methacrylate (0.16 mole) using benzoyl peroxide (0.5% by weight) as the initiator. The resulting polymer can be cast from DSMO solution as a brown, transparent film.

P59 POLYCONDENSATION PRODUCT OF MALEIC ANHYDRIDE, AZELAIC ACID AND PROPYLENE GLYCOL CROSS-LINKED BY TRI-N-BUTYLTIN METHACRYLATE

P59 is prepared similar to the above method by reacting maleic anhydride (0.225 mole), azelaic acid (0.275 mole), and propylene glycol (0.5 mole). While the unsaturated alkyd is warm (between 70° and 80°C) it is dissolved in tri-n-butyltin methacrylate (0.225 mole). Benzoyl peroxide (1.0% by weight) is dissolved in this reaction mixture. The fluid is then degassed by placing it in a vacuum and poured into a metal mold. The mold is composed of two steel plates treated with Dow Corning "20" compound (a silicone release agent). The filled mold fastened by "c" clamps and the resin is cured at 40°C for 14 hours followed by a cure at 80°C for 6 hours. The resultant polymer is a white waxy solid. The acid number 65 and analysis shows 15.39% Sn.

P61 POLYCONDENSATION PRODUCT OF MALEIC ANHYDRIDE, AZELAIC ACID AND PROPYLENE GLYCOL CROSS-LINKED BY TRI-N-BUTYLTIN MEMETH-ACRYLATE

P61 is prepared similar to 59. Maleic anhydride (0.3 mole), azelaic acid (0.2 mole), and propylene glycol (0.55 mole) are reacted. This unsaturated alkyd resin is cured with tri-n-butyltin methacrylate (0.3 mole) and peroxide (0.5% by weight) in a polished stainless steel mold. The mold, surfaces treated with Dow Corning Release agent XR43130, are separated from one another by Teflon tube. The filled mold, fastened by "c" clamps is heated to 40°C for 14 hours followed by 80°C for 6 hours. The resulting polymer is a yellow, opaque solid. The acid number is 60.

Organometallic curing agents for epoxy resins have been synthesized. Glycine, p-aminobenzoic acid, and 2-acetamidoacrylic acid are used because they contain active hydrogen groups needed to cure an epoxy resin, as well as carboxylic groups which could be esterfied to form organometallic esters. The preparation of the tributyltin ester of each acid is based on the reaction of the carboxylic group with bis (tri-n-butyltin) oxide in a 2:1 molar ratio (table 1). The catalyst in each reaction is p-toluenesulfonic acid (used 0.5% by weight).

TABLE 1

PREPARATION OF AN ORGANOMETALLIC CURING AGENT
(CATALYST: p-TOLUENESULFONIC ACID, 0.5% BY WEIGHT)

| Curing Agent | Ester Synthesis | Reactants Acid | Organometallic | Solvent | Reaction Temp. °C | Reaction Time, hr |
|---|---|---|---|---|---|---|
| E1 | Tributyltin glycinate | Glycine | Bistributyltin oxide | Ethanol: $H_2O$ (1:1) | 78 | 22 |
| E2 | Tributyltin p-aminobenzoate | p-aminobenzoic acid | Bistributyltin oxide | Ethyl acetate | 82 | 30 |
| E3 | Tributyltin ester of 2-acetamidoacrylic acid | 2-acetatamidoacrylic acid | Bistributyltin oxide | Dimethylformamide | 80 | 12 |

These curing agents or similar curing agents can be used to cure epoxy resins. For example, El cured successfully Epon 1001 a high molecular weight epoxy resin produced by the condensation of epichlorohydrin with biphenol A, and obtainable from the Shell Chemical Co. In this fashion an epoxy resin may have the organotin moiety incorporated therein and render the epoxy resin a suitable nonpolluting antifouling agent.

EXAMPLES FOR CHEMICALLY BINDING ORGANOTIN ON EPOXY BACKBONES

I. Poly(tributyltin methacrylate/glycidyl methacrylate)

The reaction is carried out in a 300 ml, 3-necked flask equipped with a reflux condenser, a thermometer such that it reads the temperature of the vapor, and a magnetic stirrer. Tributyltin methacrylate (0.07 moles), glycidyl methacrylate (0.07 moles) and 2,2'-azobis(2-methylpropionitrile) (0.6% by weight) are reacted in 90 ml of toluene. The reaction is refluxed for 16 hours between 75°–80°C. The polymer is a clear, film forming resin which can be cured to a hard film by methanediamine (one equivalent of N-H is used for each equivalent of epoxide in the polymer) after 3 hours at 100°C.

II. Preparation of Tributyltin Ester of 4,4-bis(4-hydroxyphenyl) - pentanoic acid The synthesis is carried out in a reaction flask provided with an azeotropic distillation head connected to a reflux condenser, a thermometer and a stopper, an analog of bisphenol A, 4,4-bis (4-hydroxyphenyl) - pentanoic acid (0.035 mole), and tri-n-butyltin oxide (0.0175 mole) are reacted in 40 ml of benzene. After 4 hours of refluxing, 0.30 ml of $H_2O$ is collected. The ester is recrystallized from ethanol as a pale brown powder with a M. Pt. of 108°C. Analysis for the ester shows 21.79% $S_n$. This ester is reacted with epichlorohydrin to produce an organotin epoxy resin.

EXAMPLE 2

Three novel polymeric coating systems are formulated as follows:

| FORMULATION No. 1 ORGANOMETALLIC POLYMERIC COATING | |
|---|---|
| Component | Parts by Weight |
| Organometallic Polymer | 60 |
| Solvent | 40 |

In this formulation, the organometallic polymer used are all film forming and soluble in organic solvents. These polymers are poly(tributyltin acrylate), poly(tripropyltin acrylate), poly(tributyltin methacrylate), poly(tripropyltin methacrylate), and the tributyltin ester and the tripropyltin ester of poly (methyl vinyl ether/maleic acid). Organometallic copolymers of tributyltin methacrylate and methyl methacrylate in the following molar ratio 1:4, 1:1, 2:1, and 2:3, are also incorporated as organometallic polymers in this formulation. The incorporation of the methyl methacrylate into the polymer of tributyltin methacrylate allows various degrees of hardness to be obtained in the film. The more methyl methacrylate units in the copolymers, the more rigid the polymer becomes approaching the hardness of poly(methyl methacrylate). Organometallic monomers are also polymerized with styrene in place of methyl methacrylate. Furthermore, a copolymer of tributyltin methacrylate, tripropyltin methacrylate and methyl methacrylate is prepared in a 1:1:1 molar ratio which is also used as the organometallic polymer in formulation No. 1. In addition, copolymers can be prepared of two or more of the organometallic monomers and methyl methacrylate to produce an organometallic polymer suitable for use in antifouling formulation No. 1. Mixes of different organotin polymers are also used as the organometallic substituent in the formulation. Table 2 lists the mixtures used and their composition.

| FORMULATION No. 2 | ORGANOMETALLIC-VINYL RESIN SYSTEM |
|---|---|
| Components | Parts by Weight |
| Organometallic polymer | 33.0 |
| Methyl isobutyl ketone | 25.3 |
| Xylene | 22.7 |
| Polyvinyl acetate resin (Union Carbide VAGH Resin) | 11.4 |
| Organic Acid Rosin (Westvaccos WW Resin) | 7.6 |

| FORMULATION No. 3 | ORGANOMETALLIC-ACRYLIC RESIN SYSTEM |
|---|---|
| Components | Parts by Weight |
| Organometallic polymer | 33.0 |
| Acrylic polyester* | 66.0 |
| Methyl ethyl ketone peroxide | 1.0 |

*Castolite AP, available from Rohm and Haas, Co.

TABLE 2

| Mixture No. | Composition of organometallic polymers in mixture in a 1:1 ratio by weight |
|---|---|
| M1 | Poly(tributyltin methacrylate)/ Poly(tripropyltin methacrylate) |
| M3 | Poly(tributyltin acrylate)/ Poly(tripropyltin acrylate) |
| M4 | Tributyltin ester of poly(methyl vinyl ether/maleic acid)/tripropyltin ester of poly(methyl vinyl ether/maleic acid) |

The composite of two organotin polymers with each possessing a different organotin group in the coating formulation increases the kill spectrum of the biocide material, since micro- and macrofaulants are known to be susceptible in varying degrees to different biocides. As the solvent in formulation No. 1, benzene, toulene or dichloromethane are used depending on the solubility of the organometallic polymer(s) in the polymeric coating.

The organometallic polymers which are powders were incorporated into either an acrylic or vinyl resin system. The composition of these resins system are listed as follows:

The organometallic polymers incorporated into either Formulation No. 2 or No. 3 resin system are the tributyltin ester of carboxymethyl cellulose, a high density poly)tributyltin methacrylate and poly(triphenyltin acrylate).

EXAMPLE 3

The antifouling performance of the low leaching organometallic formulation was proven at the United States Naval Shipyard at Pearl Harbor Hawaii which is a heavy fouling area. The panels are judged by the percentage of surface covered by fouling. The fouling rating is determined as 100 minus the percent covered by fouling. The polymeric materials showed 90–100% antifouling performance after many months of exposure to severe tropical fouling conditions as indicated in Table 3.

The low leaching organometallic polymer compositions of this invention permit control of marine fouling organisms including bacteria, algae, tubeworms, hydroids, bryoyoans, marine borers, barnacles, Limnoria and tunicates. Many of the compositions are transparent and devoid of color. They are not deactivated by contact with steel or aluminum and do not contribute to galvanic corrosion.

TABLE 3

| Organometallic Polymer or Mixture No. | Formulation No. Organometallic Polymer Incorporated In: | % Antifouling Performance | Months Exposed |
|---|---|---|---|
| Poly(tributyltin acrylate) | No. 1 | 100 | 16 |
| Poly(tripropyltin acrylate) | No. 1 | 100 | 6 |
| Poly(tributyltin acrylate/ tripropyltin acrylate) | No. 1 | 100 | 6 |
| Poly(tributyltin methacrylate) | No. 2 & No. 3 | 90 | 19 |
| Poly(tributyltin acrylate) | No. 1 | 100 | 16 |
| Poly(tripropyltin acrylate) | No. 1 | 90 | 17 |
| Poly(triphenyltin acrylate) | No. 2 & No. 3 | 100 | 10 |
| Poly(tributyltin methacrylate) | No. 1 | 100 | 17 |
| Poly(tripropyltin methacrylate) *High Density Polymer Tributyltin ester of carboxymethyl cellulose | No. 1 | 100 | 8 |
| | No. 2 | 90 | 5 |
| Tributyltin ester of poly (methyl vinyl ether/maleic acid) | No. 1 | 100 | 17 |
| Tributyltin ester of poly (methyl vinyl ether/maleic acid)+ Tripropyltin ester of poly | No. 1 | 100 | 17 |

TABLE 3-continued

| Organometallic Polymer or Mixture No. | Formulation No. Organometallic Polymer Incorporated In: | % Antifouling Performance | Months Exposed |
|---|---|---|---|
| (methyl vinyl ether/maleic acid) | No. 1 | 100 | 16 |
| Tripropyltin ester of poly (methyl vinyl ether/maleic acid) + | No. 1 | 100 | 12 |
| Poly(tributyltin methacrylate/ methyl methacrylate) (1:4 molar ratio) | No. 1 | 100 | 16 |
| Poly(tributyltin methacrylate/ methyl methacrylate) (2:1 molar ratio) | No. 1 | 100 | 17 |
| Poly(tributyltin methacrylate/ methyl methacrylate) (1:1 molar ratio) | No. 1 | 100 | 17 |
| Poly(tributyltin methacrylate/ methyl methacrylate) (2:3 ratio) | No. 1 | 100 | 17 |
| M1 | No. 1 | 100 | 16 |
| M3 | No. 1 | 100 | 16 |
| M4 | No. 1 | 100 | 16 |
| Poly(tributyltin methacrylate/ tripropyltin methacrylate/ methyl methacrylate) | No. 1 | 100 | 5 |
| Poly(tributyltin methacrylate/ styrene) | No. 1 | 100 | 9 |

Differences in molecular weight of organometallic polymers did not affect the antifouling performance of those polymers tested. Exposure data indicates that the optimum antifouling performance may be expected from the organometallic polymers which are suitable for incorporation into formulation No. 1 and which possess a variety of organometallic groups attached to the polymer backbone.

Tables 4 and 5 show the makeup and test of various polyester formulas.

EXAMPLE 4

The relationship between the sea water solubility biotoxicity of organometallic polymers and a standard paint system was determined. Relative sea water solubility of candidate organometallic polymers and a conventional tri-n-butyltin fluoride based antifouling paint was studied using a Burrell Wrist-Action Shaker. Each organometallic polymer was dried at 0.5 mm Hg and 180°C for one week. Approximately 5 gram samples of each polymer were placed in 50 ml of artificial sea water (Rila Marine Mix) which were then agitated continuously. The tri-n-butyltin fluoride based antifouling paint was coated on a fluorinated panel surface to facilitate removal. After air drying, 5 grams of this paint film was also placed in 50 ml of artificial sea water and agitated continuously. The sea water was decanted and replaced with a fresh 50 ml quantity every 3 days. The decanted water was analyzed for tin content using a Perkin Elmer Model 303 Atomic Absorbtion Spectrophotometer.

TABLE 4

UNSATURATED POLYESTER RESINS PREPARED BY CONDENSATION REACTION

| Unsaturated Polyester Resin Synthesized | Reactants | | | |
|---|---|---|---|---|
| Polymer Identification*+ | Polybasic acid(s) | Polyhydric alcohol(s) | Molar Ratio of acids(s) to alcohol(s) | Solvent(s) |
| P52A | Maleic anhydride | ethylene glycol, propylene glycol | 1.25:0.35:1.0 | toluene |
| P53A | Maleic anhydride | ethylene glycol, propylene glycol | 1.25:0.35:1.0 | toluene xylene |
| P54A | Sebacic acid | 2-buetene-1,4-diol | 1.0:1.0 | xylene |
| P56A | Maleic anhydride | D-Sorbitol | 1.0:1.0 | dimethyl sub |
| P57A | Maleic anhydride phthalic anhydride | propylene glycol | 1.0:0.63:1.8 | toluene, xylene |
| P59A | Maleic anhydride, Azelaic acid | propylene glycol | 0.225:0.275:0.50 | — |
| P61A | Maleic anhydride, Azelaic | propylene glycol | 0.3:0.2:0.5 | — |

TABLE 4-continued
UNSATURATED POLYESTER RESINS PREPARED BY CONDENSATION REACTION

| Unsaturated Polyester Resin Synthesized Polymer Identification*+ | Reactants Polybasic acid(s) | Polyhydric alcohol(s) | Molar Ratio of acids(s) to alcohol(s) | Solvent(s) |
|---|---|---|---|---|
| | acid | | | |

*+preparation of each polyester found in reference(s) following the polymer letter A after the polymer indicates the resin is uncured.

TABLE 5
ANTIFOULING PERFORMANCE OF ORGANOMETALLIC POLYESTERS

| Organometallic Polyester | % Antifouling Performance | Months Exposed |
|---|---|---|
| P52+ | | |
| P53 | 100 | 5 |
| P54 | 100 | 5 |

*These organometallic polyesters are either coated on a panel or exposed as a ⅜" thick plastic cross section to determine their antifouling effectiveness. All of the above polyesters and those listed in Table 4 are cured with tributyltin methacrylate.

These results showed that methacrylic organometallic polymers have good antifouling capability, while releasing organometallic ions at least one order of magnitude less than a state-of-the-art tri-n-butyltin fluoride based antifouling paint. During five weeks of agitation in artificial sea water P42, poly(tri-n-butyltin methacrylate/methyl methacrylate), had released 45% less organotin ions than P41, poly(tri-n-butyltin methacrylate). P41 has a 33% greater molar substitution of tri-n-butyltin moieties than P42. This data indicates that the degree of leaching from an organometallic polymer may be controlled by chemical modification of its polymer matrix.

Obviously, many modifications and variations of the present invention are possible in light of the above teachings. It is therefore to be understood that, within the scope of the appended claims, the invention may be practiced otherwise than as specifically described.

What is claimed as new and desired to be secured by Letters Patent of the United States is:

1. A nonpolluting, antifouling composition consisting essentially of a 1,2 epoxy polymer and a curing agent for the epoxy polymer, wherein said curing agent comprises an active hydrogen containing compound capable of crosslinking the epoxy polymer, said compound having as a substituent a carboxylic acid group which is chemically bonded to an organo-tin compound selected from the group consisting of tin oxides and tin hydroxides of the formula:

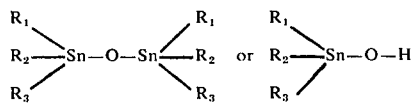

wherein $R_1$, $R_2$ and $R_3$ are selected from the group consisting of propyl, butyl, phenyl and benzyl, and $R_1$, $R_2$ and $R_3$ are the same or different, and wherein said curing agent acts to crosslink the epoxy polymer.

2. The composition of claim 1 which additionally contains an organic solvent.

3. The composition of claim 1 wherein the organo-tin compound is chemically bonded to a first unsaturated acid monomer and the curing agent is low molecular weight copolymer of the organo-tin containing unsaturated acid monomer and a second unsaturated acid monomer.

4. The composition of claim 3 wherein the organo-tin compound is chemically bonded to a first acrylic type acid monomer and the curing agent is a low molecular weight copolymer of the organo-tin containing acrylic type acid monomer and a second acrylic type acid monomer.

5. The composition of claim 3 wherein the organo-tin compound is tributyltin oxide, the first unsaturated acid monomer is methacrylic acid, and the second unsaturated acid monomer is methacrylic acid.

6. The composition of claim 5 wherein the epoxy polymer is a glycidyl ether epoxy resin.

7. The composition of claim 1 wherein the active hydrogen containing compound is selected from the group consisting of amines, polyamines and polycarboxylic acids.

8. The composition of claim 7 wherein the amines are selected from the group consisting of glycine, p-aminobenzoic acid and 2-acetamidoacrylic acid.

9. The composition of claim 7 wherein the polycarboxylic acid is $CO_2H\text{-}CH = CH\text{-}CO_2H$.

10. The composition of claim 8 wherein the organo-tin compound is bistributyltin oxide.

11. The composition of claim 1 wherein the epoxy polymer is a condensation product of epichlorohydrin and bisphenol A.

12. The composition of claim 10 wherein the epoxy polymer is a condensation product of epichlorohydrin and bisphenol A.

13. The composition of claim 7 wherein the epoxy polymer is a copolymer of an organo-tin methacrylate and glycidyl methacrylate.

14. The composition of claim 13 wherein the organo-tin methacrylate is tributyltin methacrylate.

15. The composition of claim 7 wherein the epoxy polymer is a copolymer of an organo-tin methacrylate and a glycidyl ether of an unsaturated analogue of bisphenol A having the formula:

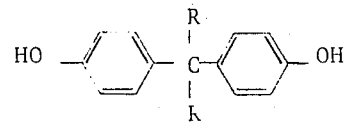

wherein one or both R groups are unsaturated alkyl chains.

16. A method for preventing the growth of fouling organisms on marine structures which comprises forming said structures from a nonpolluting organo-tin containing 1,2 epoxy polymer wherein the epoxy polymer is chemically bonded to an organo-tin compound selected from the group consisting of tin oxides and tin hydroxides of the formula:

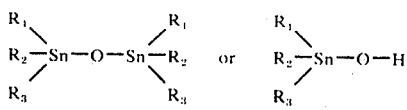

wherein $R_1$, $R_2$ and $R_3$ are selected from the group consisting of propyl, butyl, phenyl and benzyl, and $R_1$, $R_2$ and $R_3$ are the same or different, by an esterification reaction between the organo-tin compound and a carboxylic acid group present on the epoxy polymer.

17. The method of claim 16 wherein the marine structure is formed by molding the organo-tin containing epoxy polymer into the desired structure.

18. The method of claim 17 wherein the organo-tin containing epoxy polymer is a glass-reinforced polymer.

19. The method of claim 16 wherein the organo-tin compound is chemically bonded directly to the epoxy polymer through a carboxylic acid group present on the polymer backbone.

20. The method of claim 16 wherein the organo-tin compound is chemically bonded to the epoxy polymer by means of a curing agent for the epoxy polymer, wherein said curing agent comprises an active hydrogen containing compound capable of crosslinking the epoxy polymer, said compound having as a substituent a carboxylic acid group which is chemically bonded to the organo-tin compound, and wherein said curing agent acts to crosslink the epoxy polymer.

21. The method of claim 20 wherein the epoxy polymer is a condensation product of epichlorohydrin and bisphenol A.

22. The method of claim 21 wherein the organo-tin compound is bistributytin oxide.

23. A method for preventing the growth of fouling organisms on marine structures which comprises applying to said structures a coating of a non-polluting organo-tin containing 1,2 epoxy polymer wherein the epoxy polymer is chemically bonded to an organo-tin compound selected from the group consisting of tin oxides and tin hydroxides of the formula:

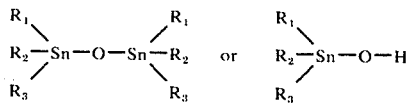

wherein $R_1$, $R_2$ and $R_3$ are selected from the group consisting of propyl, butyl, phenyl and benzyl, and $R_1$, $R_2$ and $R_3$ are the same or different, by an esterification reaction between the organo-tin compound and a carboxylic acid group present on the epoxy polymer.

24. The method of claim 23 wherein the organo-tin compound is chemically bonded directly to the epoxy polymer through a carboxylic acid group present on the polymer backbone.

25. The method of claim 23 wherein the organo-tin compound is chemically bonded to the epoxy polymer by means of a curing agent for the epoxy polymer, wherein said curing agent comprises an active hydrogen containing compound capable of crosslinking the epoxy polymer, said compound having as a substituent a carboxylic acid group which is chemically bonded to the organo-tin compound, and wherein said curing agent acts to crosslink the epoxy polymer.

26. The method of claim 25 wherein the epoxy polymer is a condensation product of epichlorohydrin and bisphenol A.

27. The method of claim 26 wherein the organo-tin compound is bistributytin oxide.

28. A method for preventing the growth of fouling organisms on marine structures which comprises impregnating said structures with a non-polluting organo-tin containing 1,2 epoxy polymer wherein the epoxy polymer is chemically bonded to an organo-tin compound selected from the group consisting of tin oxides and tin hydroxides of the formula:

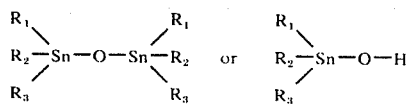

wherein $R_1$, $R_2$ and $R_3$ are selected from the group consisting of propyl, butyl, phenyl and benzyl, and $R_1$, $R_2$ and $R_3$ are the same or different, by an esterification reaction between the organo-tin compound and a carboxylic acid group present on the epoxy polymer.

29. The method of claim 28 wherein the organo-tin compound is chemically bonded directly to the epoxy polymer through a carboxylic acid group present on the polymer backbone.

30. The method of claim 28 wherein the organo-tin compound is chemically bonded to the epoxy polymer by means of a curing agent for the epoxy polymer, wherein said curing agent comprises an active hydrogen containing compound capable of crosslinking the epoxy polymer, said compound having as a substituent a carboxylic acid group which is chemically bonded to the organo-tin compound, and wherein said curing agent acts to crosslink the epoxy polymer.

31. The method of claim 30 wherein the epoxy polymer is a condensation product of epichlorohydrin and bisphenol A.

32. The method of claim 31 wherein the organo-tin compound is bistributytin oxide.

33. A nonpolluting, antifouling composition consisting essentially of an organo-tin containing epoxy polymer wherein said epoxy polymer is of the formula:

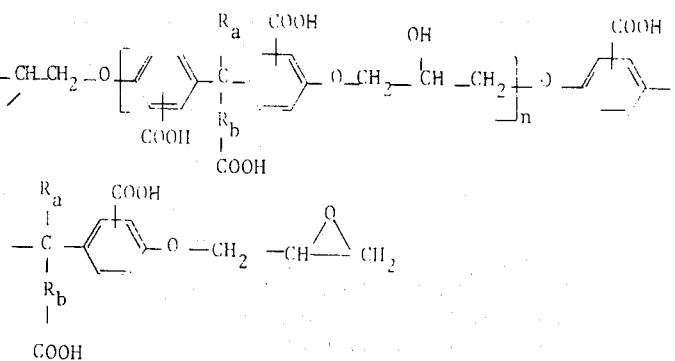

wherein $R_a$ and $R_b$ are alkyl groups of up to 25 carbon atoms, $R_a$ and $R_b$ are the same or different, and n represents the number of repeating units and ranges from 1 to about 35,000, and is chemically bonded directly through the carboxyl groups on the polymer backbone to an organo-tin compound selected from the group consisting of tin oxides and tin hydroxides of the formula:

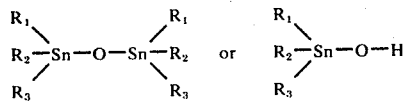

wherein $R_1$, $R_2$ and $R_3$ are selected from the group consisting of propyl, butyl, phenyl and benzyl, and $R_1$, $R_2$ and $R_3$ are the same or different.

34. A nonpolluting, antifouling composition consisting essentially of an organo-tin containing epoxy polymer wherein said epoxy polymer is a condensation product of epichlorohydrin and 4,4-bis(4-hydroxyphenyl) pentanoic acid and is chemically bonded directly through the carboxyl groups on the polymer backbone to an organo tin compound selected from the group consisting of tin oxides and tin hydroxides of the formula:

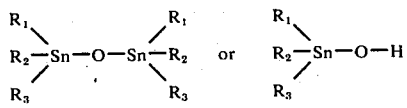

wherein $R_1$, $R_2$ and $R_3$ are selected from the group consisting of propyl, butyl, phenyl and benzyl, and $R_1$, $R_2$ and $R_3$ are the same or different.

35. The composition of claim 34 wherein the organo-tin compound is bistributyltin oxide.

* * * * *